US010482076B2

United States Patent
Bensberg

(10) Patent No.: US 10,482,076 B2
(45) Date of Patent: Nov. 19, 2019

(54) SINGLE LEVEL, MULTI-DIMENSION, HASH-BASED TABLE PARTITIONING

(71) Applicant: SAP SE, Walldorf (DE)

(72) Inventor: Christian Bensberg, Heidelberg (DE)

(73) Assignee: SAP SE, Walldorf (DE)

( * ) Notice: Subject to any disclaimer, the term of this patent is extended or adjusted under 35 U.S.C. 154(b) by 1132 days.

(21) Appl. No.: 14/826,626

(22) Filed: Aug. 14, 2015

(65) Prior Publication Data
US 2017/0046371 A1    Feb. 16, 2017

(51) Int. Cl.
*G06F 16/22* (2019.01)
*G06F 16/2455* (2019.01)
*G06F 16/28* (2019.01)

(52) U.S. Cl.
CPC ...... *G06F 16/2282* (2019.01); *G06F 16/2456* (2019.01); *G06F 16/283* (2019.01)

(58) Field of Classification Search
CPC .................................................. G06F 16/2456
See application file for complete search history.

(56) References Cited

U.S. PATENT DOCUMENTS

| | | | | |
|---|---|---|---|---|
| 6,931,390 | B1* | 8/2005 | Zait | G06F 16/24557 |
| 8,918,388 | B1* | 12/2014 | Chen | G06F 16/283 |
| | | | | 707/714 |
| 8,924,426 | B2* | 12/2014 | Chattopadhyay | G06F 9/5066 |
| | | | | 707/793 |
| 9,720,602 | B1* | 8/2017 | Chen | G06F 16/214 |
| 2005/0187977 | A1* | 8/2005 | Frost | G06F 16/278 |
| 2012/0246158 | A1 | 9/2012 | Ke et al. | |
| 2012/0284235 | A1* | 11/2012 | Swett | G06F 16/278 |
| | | | | 707/668 |
| 2014/0214796 | A1* | 7/2014 | Barber | G06F 16/2456 |
| | | | | 707/714 |
| 2016/0026667 | A1* | 1/2016 | Mukherjee | G06F 16/2282 |
| | | | | 707/714 |
| 2018/0004810 | A1* | 1/2018 | Cheng | G06F 16/24544 |
| 2018/0075077 | A1* | 3/2018 | Wang | G06F 12/1009 |

OTHER PUBLICATIONS

VLDB and Partitioning Guide, Oracle Database VLDB and Partitioning Guide, 11g Release 1 (11.1), Jul. 2007, 216 pages.
SAP HANA Administration Guide, SAP HANA Platform SPS 09, Document Version: 1.1—Feb. 16, 2015, 838 pages.
SAP HANA SQL and System Views Reference, SAP HANA Platform SPS 09, Document Version: 1.0—Feb. 16, 2015, 1108 pages.
Using Partitioning in a Data Warehouse Environment, Oracle Database VLDB and Partitioning Guide, 11g Release 2 (11.2), 2015, 18 pages.

* cited by examiner

*Primary Examiner* — Charles E Lu
(74) *Attorney, Agent, or Firm* — Fish & Richardson P.C.

(57) ABSTRACT

In a general aspect, a method includes inserting a record in a partitioned fact table of a star schema data mart. Inserting the record can include determining a first hash value from a first dimension value of the record and determining a first set of candidate partitions from the first hash value. The method can further include determining a second hash value from a second dimension value of the record and determining a second set of candidate partitions from the first hash value. The method can further include comparing the first set of candidate partitions with the second set of candidate partitions to determine a common partition and inserting the record into the common partition.

11 Claims, 11 Drawing Sheets

|   | Value combination | Mapping | Partition Mapping 0 | 1 | 2 | 3 |
|---|---|---|---|---|---|---|
| (a) | $Mod\_4(hash(d1)) = 0$ | [0,1] | A | B |   |   |
|     | $Mod\_4(hash(d2)) = 0$ | [0,2] | C |   | D |   |
| (b) | $Mod\_4(hash(d1)) = 0$ | [0,1] | A | B |   |   |
|     | $Mod\_4(hash(d2)) = 1$ | [0,2] |   | C |   | D |
| (c) | $Mod\_4(hash(d1)) = 0$ | [0,1] | A | B |   |   |
|     | $Mod\_4(hash(d2)) = 2$ | [0,2] | D |   | C |   |
| (d) | $Mod\_4(hash(d1)) = 0$ | [0,1] | A | B |   |   |
|     | $Mod\_4(hash(d2)) = 3$ | [0,2] |   | D |   | C |
| (e) | $Mod\_4(hash(d1)) = 1$ | [0,1] |   | A | B |   |
|     | $Mod\_4(hash(d2)) = 0$ | [0,2] | C |   | D |   |
| (f) | $Mod\_4(hash(d1)) = 1$ | [0,1] |   | A | B |   |
|     | $Mod\_4(hash(d2)) = 1$ | [0,2] |   | C |   | D |
| (g) | $Mod\_4(hash(d1)) = 1$ | [0,1] |   | A | B |   |
|     | $Mod\_4(hash(d2)) = 2$ | [0,2] | D |   | C |   |
| (h) | $Mod\_4(hash(d1)) = 1$ | [0,1] |   | A | B |   |
|     | $Mod\_4(hash(d2)) = 3$ | [0,2] |   | D |   | C |
| (i) | $Mod\_4(hash(d1)) = 2$ | [0,1] |   |   | A | B |
|     | $Mod\_4(hash(d2)) = 0$ | [0,2] | C |   | D |   |
| (j) | $Mod\_4(hash(d1)) = 2$ | [0,1] |   |   | A | B |
|     | $Mod\_4(hash(d2)) = 1$ | [0,2] |   | C |   | D |
| (k) | $Mod\_4(hash(d1)) = 2$ | [0,1] |   |   | A | B |
|     | $Mod\_4(hash(d2)) = 2$ | [0,2] | D |   | C |   |
| (l) | $Mod\_4(hash(d1)) = 2$ | [0,1] |   |   | A | B |
|     | $Mod\_4(hash(d2)) = 3$ | [0,2] |   | D |   | C |
| (m) | $Mod\_4(hash(d1)) = 3$ | [0,1] | B |   |   | A |
|     | $Mod\_4(hash(d2)) = 0$ | [0,2] | C |   | D |   |
| (n) | $Mod\_4(hash(d1)) = 3$ | [0,1] | B |   |   | A |
|     | $Mod\_4(hash(d2)) = 1$ | [0,2] |   | C |   | D |
| (o) | $Mod\_4(hash(d1)) = 3$ | [0,1] | B |   |   | A |
|     | $Mod\_4(hash(d2)) = 2$ | [0,2] | D |   | C |   |
| (p) | $Mod\_4(hash(d1)) = 3$ | [0,1] | B |   |   | A |
|     | $Mod\_4(hash(d2)) = 3$ | [0,2] |   | D |   | C |

FIG. 4

Insert data for Fact Table
Partition_0: ↗ 610

| ProductDim | SalesDocumentDim | Amount |
|---|---|---|
| Cell_phone | 342335 | 1 |
| Fridge | 342339 | 3 |

Insert data for Fact Table
Partition_1: ↗ 620

| ProductDim | SalesDocumentDim | Amount |
|---|---|---|
| Cell_phone | 342336 | 3 |
| Blender | 342336 | 2 |

Insert data for Fact Table
Partition_2: ↗ 630

| ProductDim | SalesDocumentDim | Amount |
|---|---|---|
| Blender | 342339 | 2 |

Insert data for Fact Table
Partition_3: ↗ 640

| ProductDim | SalesDocumentDim | Amount |
|---|---|---|
| Laptop | 342335 | 2 |

|     | Value combination | Mapping | Partition Mapping | | |
|-----|-------------------|---------|---|---|---|
|     |                   |         | 0 | 1 | 2 |
| (a) | Mod 3(hash(d1)) = 0 | [0,1] | A | B |   |
|     | Mod 3(hash(d2)) = 0 | [0,1] | C | D |   |
| (b) | Mod 3(hash(d1)) = 0 | [0,1] | A | B |   |
|     | Mod 3(hash(d2)) = 1 | [0,1] |   | C | D |
| (c) | Mod 3(hash(d1)) = 0 | [0,1] | A | B |   |
|     | Mod 3(hash(d2)) = 2 | [0,1] | D |   | C |
| (d) | Mod 3(hash(d1)) = 1 | [0,1] |   | A | B |
|     | Mod 3(hash(d2)) = 0 | [0,1] | C | D |   |
| (e) | Mod 3(hash(d1)) = 1 | [0,1] |   | A | B |
|     | Mod 3(hash(d2)) = 1 | [0,1] |   | C | D |
| (f) | Mod 3(hash(d1)) = 1 | [0,1] |   | A | B |
|     | Mod 3(hash(d2)) = 2 | [0,1] | D |   | C |
| (g) | Mod 3(hash(d1)) = 2 | [0,1] | B |   | A |
|     | Mod 3(hash(d2)) = 0 | [0,1] | C | D |   |
| (h) | Mod 3(hash(d1)) = 2 | [0,1] | B |   | A |
|     | Mod 3(hash(d2)) = 1 | [0,1] |   | C | D |
| (i) | Mod 3(hash(d1)) = 2 | [0,1] | B |   | A |
|     | Mod 3(hash(d2)) = 2 | [0,1] | D |   | C |

FIG. 11

SINGLE LEVEL, MULTI-DIMENSION, HASH-BASED TABLE PARTITIONING

TECHNICAL FIELD

This description relates to partitioning of database tables.

BACKGROUND

Partitioning fact tables in databases implemented using multiple related tables, such as a star schema configuration (e.g., a database including one or more fact tables, where each fact table has a plurality of associated dimension tables), can be problematic. For instance, dimension tables in certain star schema implementations are not partitioned. Accordingly, in order to properly process a query based on a dimension value (e.g., product name) included in a given dimension table (e.g., a product dimension table) of the database, the given dimension table must be joined with each of the corresponding fact table partitions. For large dimension tables, this may require large volumes of data (e.g., from the given dimension table) to be sent to each of the remote hosts (of the database) on which partitions of the corresponding fact table are located, where only a portion of the dimension table may be needed to properly execute a corresponding join operation.

In other implementations, fact table partitions can be defined based on a single dimension of a given star schema. For instance, in a star schema that includes a product dimension table (e.g., including product names and product groups) and a sales document dimension table (e.g., including an indexed listing of sales personnel), an associated fact table can be partitioned based on the product names (which can be included in a single column of the product dimension table), such as by using respective modulo results from hash values of the product names to determine which partition of the fact table a given record should be stored in. Such approaches can reduce the amount of data (from the product dimension table) that needs to be sent to each of the remote hosts on which partitions of the fact table are stored. However, in such approaches, all data (e.g., large amounts of data) of other dimension tables of the star schema may still need to be sent to each remote host (e.g., to facilitate outer join operations), which can still result in a large volume of data being sent over an associated network.

In still other implementations, partitioning of a fact table may be accomplished using a hierarchical, multi-level approach where a first dimension is used to determine a partition in which to store a record (or where a record is stored) and a second dimension is used to determine a sub-partition for the record. Depending on the specific hierarchical, multi-level partitioning implementation, the sub-partitions of a given partition (e.g., top-level partition) can be stored on a single host, or can be spread over multiple hosts. Such hierarchical, multi-level approaches, however, can violate architectural constraints of a number of database implementations. For instance, such approaches may not be feasible in database architectures that require all sub-partitions of a given (top-level) partition to be stored on a single host. Such constraints can result in local unique constraint checks. Further, some database architectures may be limited to two levels of partitioning, and one level may already be used for other purposes.

SUMMARY

According to a general aspect, a computer-implemented method for inserting a record in a fact table of a database, where the fact table has multiple partitions, and the database has multiple dimension tables corresponding with the fact table, can include receiving a request to insert the record in the fact table. The method can also include determining a first hash value from a first value included in the record, the first value corresponding with a first dimension table of the multiple dimension tables, and determining, based on the first hash value, a first set of candidate partitions of the multiple partitions. The method can further include determining a second hash value from a second value included in the record, the second value corresponding with a second dimension table of the multiple dimension tables and determining, based on the second hash value, a second set of candidate partitions of the multiple partitions. The method can also further include comparing the first set of candidate partitions with the second set of candidate partitions to determine a common partition between the first set of candidate partitions and the second set of candidate partitions, and inserting the record into the common partition.

Implementations can include one or more of the following features. For example, the request can be received at a first host of the database, where the common partition can be stored in a second host of the database. The method can include, prior to inserting the record into the common partition, sending the record from a data manipulation language (DML) processor of the first host to a DML processor of the second host.

The first hash value and the second hash value can be determined using a same hash function. The first set of candidate partitions and the second set of candidate partitions can have a single common partition. The first set of candidate partitions and the second set of candidate partitions can have multiple common partitions, and selecting the common partition for storing the record can include selecting the common partition for storing the record from the multiple common partitions using a predetermined selection rule.

The first set of candidate partitions can be determined using a first predetermined pattern and the second set of candidate partitions can be determined using a second predetermined pattern. Prior to the comparing the first set of candidate partitions with the second set of candidate partitions to determine a common partition, the method can include determining a third hash value from a third value included in the record, the third value corresponding with a third dimension table of the multiple dimension tables, and determining, based on the third hash value, a third set of candidate partitions of the multiple partitions. The comparing the first set of candidate partitions with the second set of candidate partitions to determine the common partition can include comparing the first set of candidate partitions, the second set of candidate partitions and the third set of candidate partitions to determine the common partition.

In another general aspect, a computer-implemented method for joining a plurality of dimension tables of a database with a fact table of a database, where the plurality of dimension tables corresponds with the fact table, and the fact table has a plurality of partitions, each partition of the plurality of partitions being stored on a respective host of the database, can include determining a first hash value from a dimension value included in a row of a first dimension table of the plurality of dimension tables. The method can also include determining, based on the first hash value, a first set of candidate partitions of the plurality of partitions. The first set of candidate partitions can be a first subset of the plurality of partitions. The method can further include sending the row of the first dimension table to each of the respective hosts of the first set of candidate partitions. The method can also further include determining a second hash value from a dimension value included in a row of a second dimension table and determining, based on the second hash value, a second set of candidate partitions of the plurality of partitions, the second set of candidate partitions being a second subset of the plurality of partitions, the first set of candidate partitions and the second set of candidate partitions having at least one common partition. The method can still further include sending the row of the second dimension table to each of the respective hosts of the second set of candidate partitions and performing intermediate join operations. The intermediate join operations can include joining the row of the first dimension table with each partition of the first set of candidate partitions and joining the row of the second dimension table with each partition of the second set of candidate partitions.

Implementations can include one or more of the following features. For example, the first set of candidate partitions and the second set of candidate partitions can be determined using a predetermined pattern corresponding with a single-level, multi-dimension partitioning map. Partitioning of the fact table can be based on values in records of the fact table corresponding with the first dimension table and values in the records of the fact table corresponding with the second dimension table.

Prior to the performing the respective join operations, the method can include sending a third dimension table of the plurality of dimension tables to each of the respective hosts of the plurality of partitions. The performing the respective join operations can include joining the third dimension with each partition of the plurality of partitions. Partitioning of the fact table can be based on values in records of the fact table corresponding with the first dimension table and values in the records of the fact table corresponding with the second dimension table.

In another general aspect, a computer-implemented method can include receiving a request to insert a record in a fact table included in a database, where the fact table has multiple partitions, each of the multiple partitions being included in a respective host. The method can also include determining a first hash value from a first value included in the record, where the first value corresponds with a first dimension table corresponding with the fact table, and determining, based on the first hash value, a first set of candidate partitions of the multiple partitions. The method can further include determining a second hash value from a second value included in the record, where the second value corresponds with a second dimension table corresponding with the fact table, and determining, based on the second hash value, a second set of candidate partitions of the multiple partitions. The method can also further include comparing the first set of candidate partitions with the second set of candidate partitions to determine a common partition between the first set of candidate partitions and the second set of candidate partitions and inserting the record into the common partition.

The method can yet further include receiving a request to join the first dimension table and the second dimension table with the fact table; determining a third hash value from a dimension value included in a row of the first dimension table; determining, based on the third hash value, a third set of candidate partitions of the plurality of partitions the third set of candidate partitions being a first subset of the plurality of partitions; and sending the row of the first dimension table to each of the respective hosts of the third set of candidate partitions. The method can yet also include determining a fourth hash value from a dimension value included in a row of the second dimension table; determining, based on the fourth hash value, a fourth set of candidate partitions of the plurality of partitions, the fourth set of candidate partitions being a second subset of the plurality of partitions, the third set of candidate partitions and the fourth set of candidate partitions having at least one common partition; and sending the row of the second dimension table to each of the respective hosts of the fourth set of candidate partitions. The method can still further include performing intermediate join operations including joining the row of the first dimension table with each partition of the third set of candidate partitions and joining the row of the second dimension table with each partition of the fourth set of candidate partitions.

Implementations can include one or more of the following features. For example, the first set of candidate partitions and the second set of candidate partitions can have multiple common partitions. Selecting the common partition for storing the record can include selecting the common partition for storing the record from the multiple common partitions using a predetermined selection rule.

The first set of candidate partitions and the third set of candidate partitions can be determined using a first predetermined pattern. The second set of candidate partitions and the fourth set of candidate partitions can be determined using a second predetermined pattern.

Prior to the performing the intermediate join operations, the method can include sending a third dimension table of the plurality of dimension tables to each of the respective hosts of the plurality of partitions. The performing the intermediate join operations can include joining the third dimension with each partition of the plurality of partitions.

The first hash value, the second hash value, the third hash value and the fourth hash value can be determined using a same hash function. The first set of candidate partitions and the second set of candidate partitions can have a single common partition.

The details of one or more implementations are set forth in the accompa-nying drawings and the description below. Other features will be apparent from the description and drawings, and from the claims.

BRIEF DESCRIPTION OF THE DRAWINGS

FIG. 4 is a table illustrating a single-level multi-dimension, hash-based table partitioning map, according to an implementation.

FIG. 6 are tables illustrating partitions of a database table partitioned using single-level, multi-dimension, hash-based table partitioning based on the partitioning map of FIG. 4 that include records of the star schema of FIG. 3, according to an implementation.

FIG. 11 is a table illustrating another single-level multi-dimension, hash-based table partitioning map, according to an implementation.

DETAILED DESCRIPTION

Figure 1:
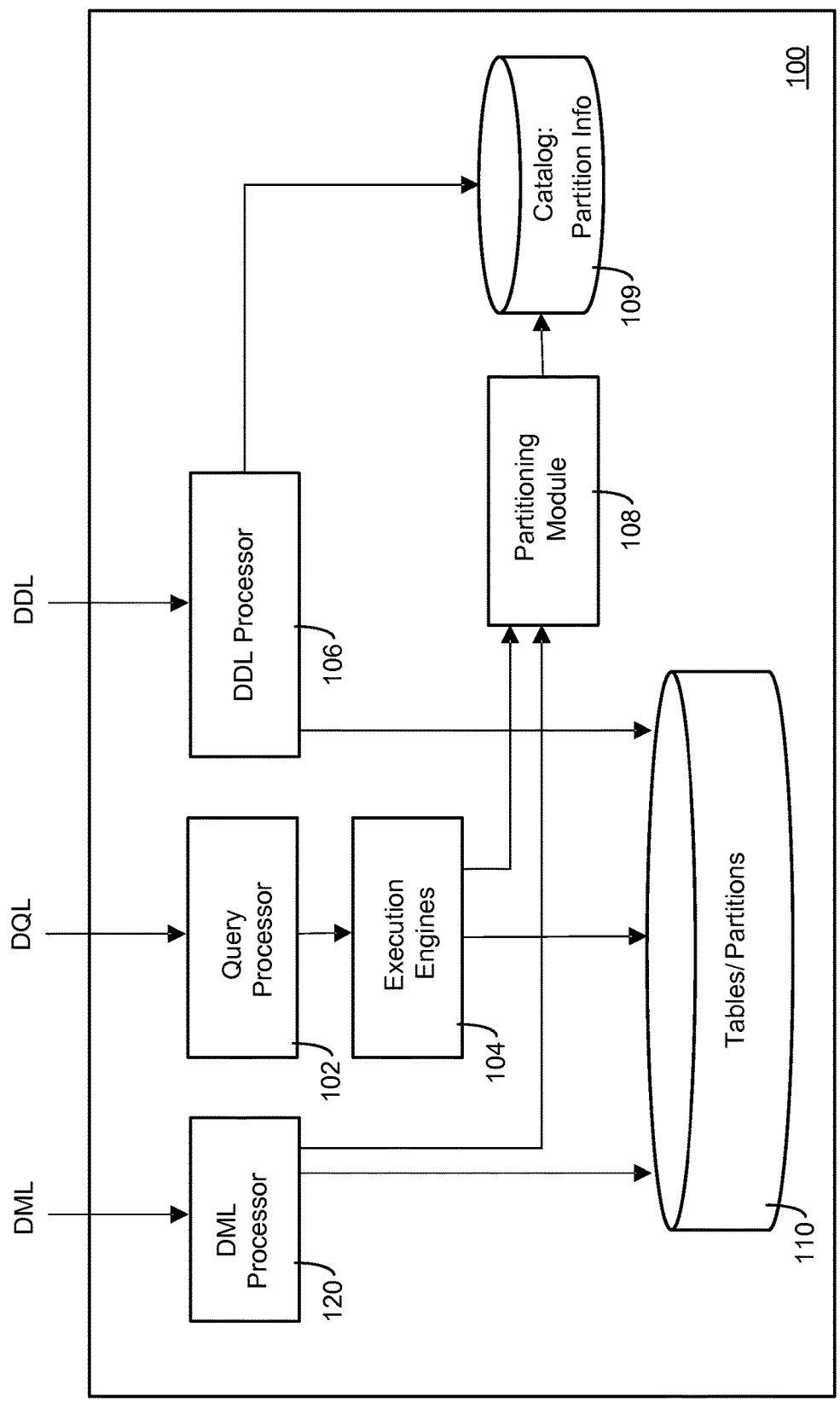
FIG. 1 is a block diagram of a database in which single-level multi-dimension, hash-based table partitioning can be implemented, according to an implementation.

FIG. 1 is a block diagram of a database 100 in which single-level multi-dimension, hash-based table partitioning can be implemented, according to an implementation. The database 100 includes a query processor 102, query execution engines 104, a data definition logic (DDL) processor 106, a partitioning module 108, Catalog: Partition information (hereafter "catalog 109", multiple tables/partitions (hereafter "tables") 110 and a data manipulation language (DML) processor 120. DML can also be referred to as data modifying language, or other appropriate terms. The DML processor 120, in the database 100, can be configured to implement (execute) statements (e.g., SQL statements) that modify data in the tables/partitions 110 (e.g., table partitions, un-partitioned tables, etc.). In some implementations, the query processor 102 and the DML processor 120 can be implemented as a single processor, e.g., an SQL processor.

The database 100 can contain data stored in the tables 110. In one example implementation, the database 100 may include an in-memory database. The database 100 receives prepared calls, statements or queries at the query processor 102 or the DML processor 120 of the database 100. Such queries, calls or statements can be used to perform a number of operations on the database 100, such as retrieving data, modifying data, removing data, adding data, creating partitions and/or removing partitions, among other possible operations.

In one example implementation, the query processor 102 and/or the DML processor 120 may include an SQL processor. In this example, queries, calls and statements received by the SQL processor may be in the form of SQL statements. Other types of query and DML processors may be implemented as part of the database 100 and different query, call and/or statement strings or formats may be used, as appropriate, based on the type of query processor 102 and/or DML processor 120 being implemented.

The tables 110 may be non-partitioned tables and/or partitioned tables. Data in partitioned tables of the tables 110 may be stored across multiple partitions (respectively located, or stored on different hosts used to implement the database 100). The DDL processor 106 can be configured to create new tables (partitioned and non-partitioned tables), remove (delete or drop) existing tables and/or re-partition existing partitioned tables, such as to rebalance memory usage (e.g., if one partition becomes relatively much larger than one or more other partitions) across multiple nodes (hosts) used to implement the database 100.

In certain implementations, partitions for a partitioned table of the tables 110 can be implemented using single-level, multi-dimension, hash-based table partitioning according to approaches described herein. Such single-level, multi-dimension, hash-based table partitioning can overcome at least some of the drawbacks of current approaches noted above. Further, partitioning tables (e.g., fact tables in a star schema data mart) using single-level, multi-dimension, hash-based table partitioning can reduce the amount of data communicated by the hosts (nodes) of the database 100 when the execution engines 104 process queries and/or join operations on tables of the database 100, e.g., in response to data query language (DQL) received by the query processor 102.

Briefly, the DDL processor 106, in response to received DDL, create a partitioned table, where the partitions of the created table are defined (specified, etc.) by the DDL processor 106 using a single-level, multi-dimension hash-based partitioning map (which can also be referred to as a partitioning map), such as the example partitioning maps shown in FIGS. 4 and 11, which are discussed in further detail below. The DDL processor 106 can provide the partitioning map to a catalog 109, which can store the partitioning map, as well as other information (e.g., metadata, such as column definitions, location, etc.) about each partition of a given partitioned table. In the database 100, the catalog 109 can be accessible to the execution engines 104, so that DML statements received by the DML processor 120 (e.g., insertions into a partitioned fact table) and DQL statements received by the query processor 102 (e.g., joins) can be processed in accordance with a corresponding partitioning map, such as using the approaches described herein.

Figure 2:
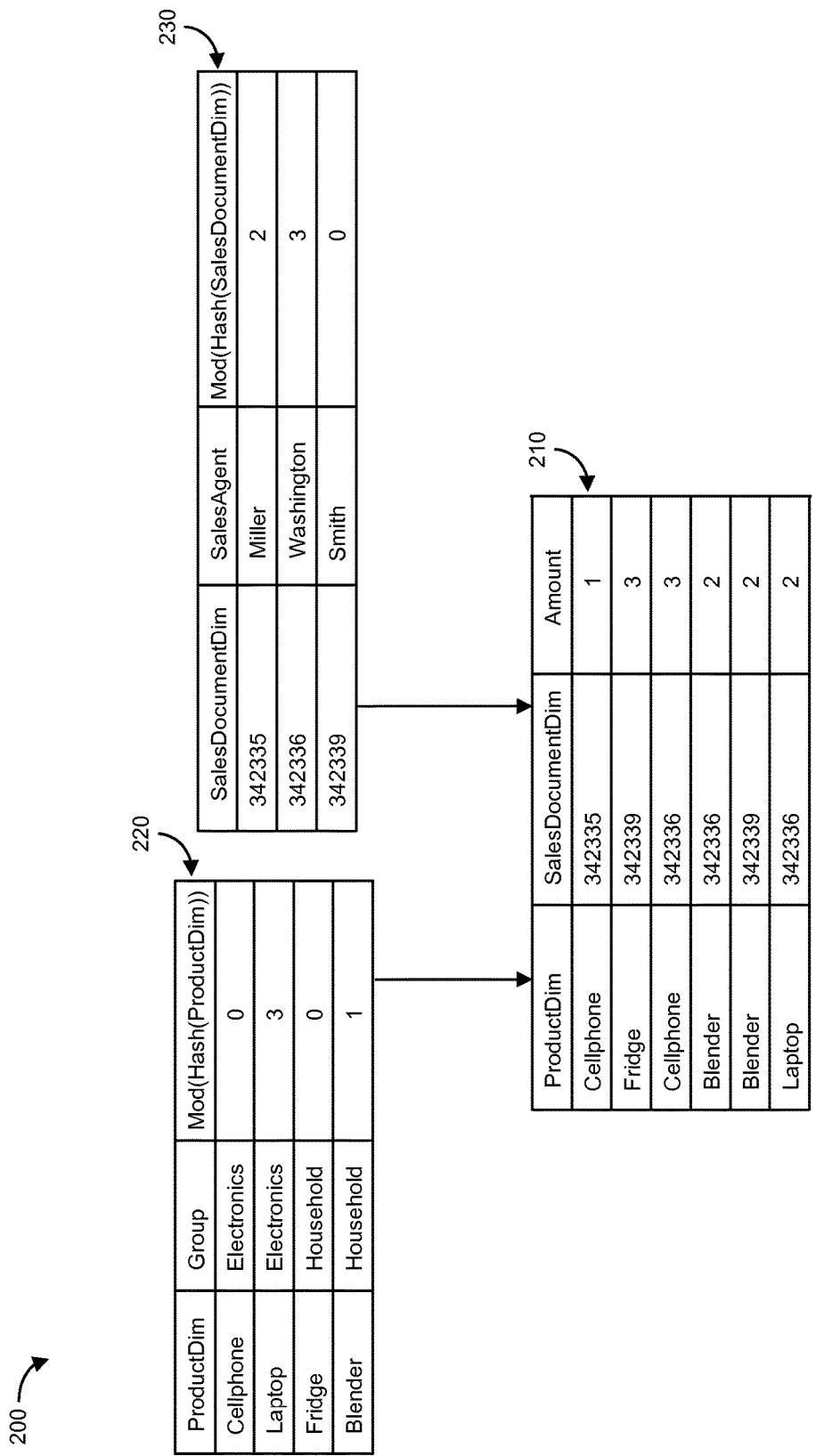
FIG. 2 is a diagram illustrating a database star schema, according to an implementation.

For purposes of illustration, the example approaches described herein are discussed with reference to databases where an access layer of the database 100 (e.g., a data mart) is implemented using a star schema. In such a star schema, a fact table (which can include records inserted by users of the database 100) can reference (correspond with, etc.) a number of dimension tables, where the dimension tables define characteristics of records (rows) include in the fact table. For instance, a first dimension table can include a table of products and attributes of those products, while a second dimension table can include a listing of sales personnel (e.g., each referenced by a unique numerical index number) and attributes of those sales personnel. Such a star schema can include additional dimension tables, or different dimension tables than those described herein. For instance, dimension tables can be used to define attributes such as date/time, geography, ranges (time, values, and so forth), etc. In other implementations, single-level, multi-dimension hash-based partitioning can be performed on database tables having other arrangements, such as a partitioned table and a related un-partitioned table FIG. 2 is a diagram illustrating a database star schema (star schema) 200, according to an implementation. The star schema 200 of FIG. 2 will be referenced in the discussion of single-level, multi-dimension hash-based partitioning approaches described herein. It will be appreciated, however, that the star schema 200 is given by way of example and for purposes of illustration, and single-level, multi-dimension hash-based partitioning can be implemented with databases having other arrangements. Furthermore, in other implementations, the fact and dimension tables of a star schema (or other database architecture) can be much larger and more complex than those shown in FIG. 2. Further, a given star schema can include additional fact tables, different fact tables, additional dimension tables and/or different dimension tables than those shown in FIG. 2.

The star schema 200 includes a fact table 210, which can be implemented as a partitioned table (e.g., having four partitions) in the database 100 of FIG. 1. The star schema 200 also includes a product dimension table 220, which includes a list of "products" in its first column (ProductDim) and, in its second column, a respective product "group" for each product in the ProductDim column. The star schema 200 further includes a sales document dimension table 230, which includes a list of index values in its first column (SalesDocumentDim) and, in its second column, a respective "sales agent" associated with each index in the SalesDocumentDim column. In the example implementations described herein, the fact table 210 is referenced as being a partitioned table, having four partitions that are respective stored on four host systems. Further, the dimension tables 220 and 230 are described as being un-partitioned tables that are each stored on a respective one of the four hosts used to implement the fact table 210, though other arrangements are possible.

As shown in FIG. 2, the dimension tables 220 and 230 can be used to define aspects of the fact table 210. For instance, when processing a query on the fact table 210, the dimension tables 220 and 230 can be joined with the fact table 210 so that the product groups and sales agent names for each record in the fact table 210 are available for responding to the query.

For example, for the first record in the fact table 210, joining the dimension tables 220 and 230 with the fact table 210 would allow a corresponding query to determine that "cell phone" is included in group "electronics" and that the "sales agent" for the first record is "Miller". That is, joining the dimension tables 220 and 230 with the fact table 210 allows a corresponding query to determine, for the first record in the fact table 210, that Miller sold one cell phone and the cell phone is part of the group electronics. Similar determinations could be made for the other records in the fact table 210 when it is joined with the dimension tables 220 and 230.

Also shown in FIG. 2 are example modulo results for each entry in the dimension tables 220 and 230. These modulo results are shown for purposes of illustration and, typically, would not be included in dimension tables of a database. In this example, the modulo results can be determined by computing a respective hash value (e.g., using a single, common hash function) from each dimension value (e.g., the ProductDim values and the SalesDocumentDim values) and then calculating respective "modulo 4" results (e.g., to implement single-level, multi-dimension hash-based partitioning for four partitions for the fact table 210). The example modulo values shown in FIG. 2 are further referenced in the following description.

Figure 3:
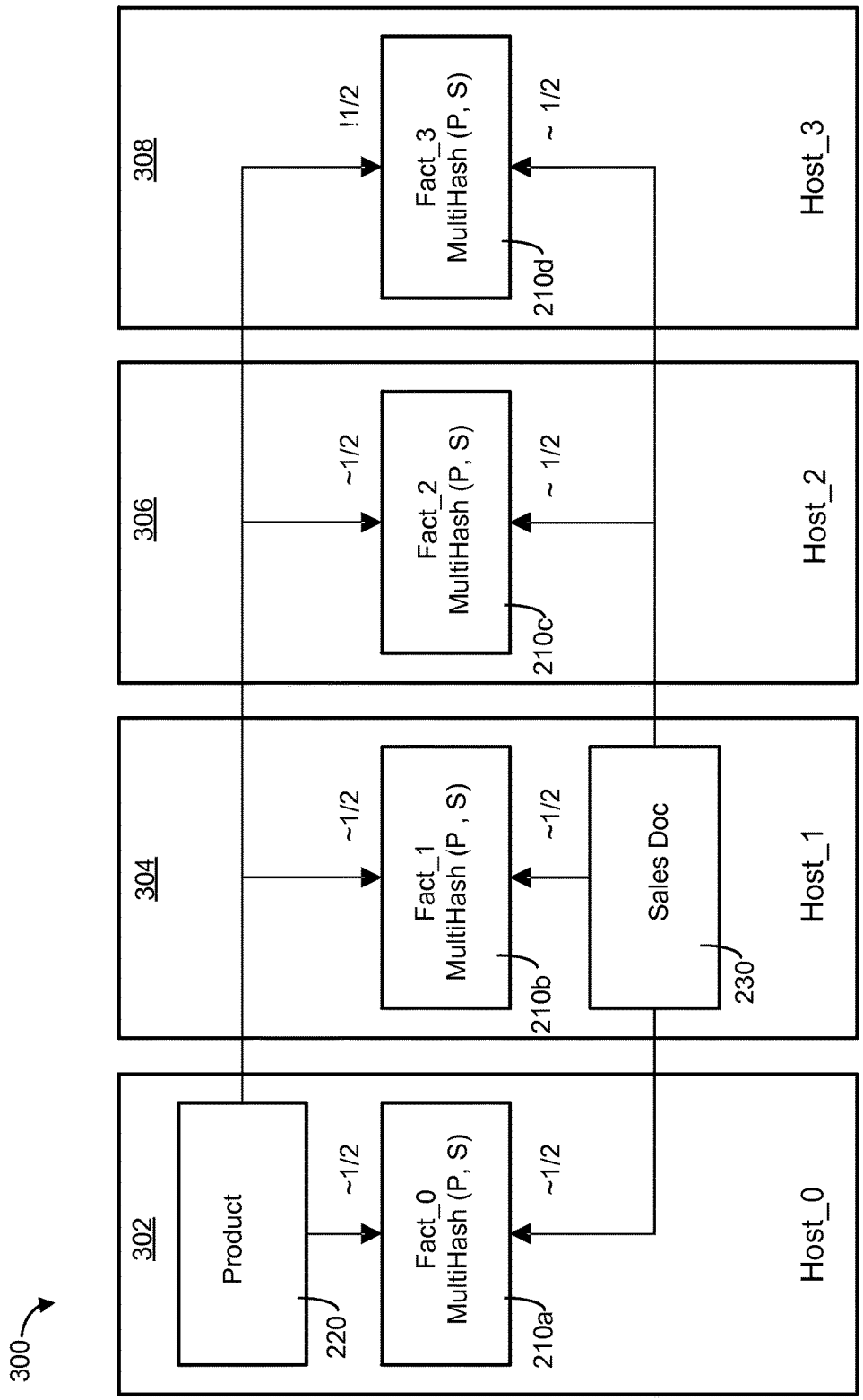
FIG. 3 is a block diagram schematically illustrating single-level multi-dimension, hash-based table partitioning in a database, according to an implementation.

FIG. 3 is a block diagram schematically illustrating single-level multi-dimension, hash-based table partitioning in a database 300, according to an implementation. For purposes of illustration, the database 300 will be described with further reference to the star schema 200 of FIG. 2, such as was previously noted. Further, the database 300 can be an implementation of the database 100 and, therefore, can include elements of the database 100 that are not shown in FIG. 3. Accordingly, as appropriate, the database 300 be will described with further reference to FIG. 1.

As shown in FIG. 3, the database 300 includes four hosts, Host_0 302, Host_1 304, Host_2 306 and Host_3 308. For clarity, hereafter the four hosts of the database 300 will be referred to as host 302, host 304, host 306 and host 308. In the database 300, the host 302 includes (stores, houses, etc.) a first partition of the fact table 210, Fact_0 (Fact Table Partition_0) 210a, and the (un-partitioned) product dimension table 220. The host 304 includes (stores, houses, etc.) a second partition of the fact table 210, Fact_1 (Fact Table Partition_1) 210b and the (un-partitioned) sales document dimension table 230. The host 306 includes (stores, houses, etc.) a third partition of the fact table 210, Fact_2 (Fact Table Partition_2) 210c. The host 308 includes (stores, houses, etc.) a fourth partition of the fact table 210, Fact_3 (Fact Table Partition_3) 210d. Again, for clarity, hereafter the four fact table partitions of the database 300 will be referred to as partition 210a, partition 210b, partition 210c and partition 210d.

As is schematically shown in FIG. 3, using single-level, multi-dimension, hash-based table partitioning to partition the fact table 210 into partitions 210a, 210b, 210c and 210d based on ProductDim and SalesDocumentDim values (e.g., designated by MultiHash(P,S) in FIG. 3) can significantly reduce the amount of data of the product dimension table 220 and the sales document dimension table that needs to be joined with each of the fact table partitions 210a, 210b, 210c and 210d. In this example, using single-level multi-dimension, hash-based table partitioning based on the ProductDim values of the dimension table 220 and the SalesDocumentDim values of the dimension table 230 can reduce the amount of data from each of the dimension tables 220 and 230 that needs to be joined with each of the fact table partitions 210a, 210b, 210c and 210d.

For instance, in this example, the amount of data that is sent can be reduced to approximately half the records (rows) in each of the product dimension tables 220 and 230 (e.g., assuming approximately equal distribution of the records of the fact table 210 across its partitions 210a, 210b, 210c and 210d). Accordingly, such an approach can reduce the amount data traffic that is transmitted for purpose of facilitating join operations to respond to a query on the fact table 210. In other words, using single-level, multi-dimension, hash-based table partitioning to partition the fact table 210 into partitions 210a, 210b, 210c and 210d can reduce the data that is used to send records of the product dimension table 220 from host 302 to the hosts 304, 306 and 308, and to send records of the sales document dimension table 230 from the host 304 to the hosts 302, 306 and 308 when performing a join of the dimension tables 220 and 230 with the fact table 210.

FIG. 4 is a table illustrating a single-level multi-dimension, hash-based table partitioning map (map) 400, according to an implementation. The map 400 can be used to implement single-level, multi-dimension, hash-based partitioning of the fact table 210 of FIG. 2 in the database 300 (or database 100), such as was briefly described above with respect to FIG. 3. For instance, the map 400 can be used to implement single-level, multi-dimension, hash-based partitioning for two dimensions (e.g., ProductDim and SalesDocumentDim) across four fact table partitions, such as the partitions 210a, 210b, 210c and 210d of the database 300. As noted above, the map 400 can be established by the DDL processor 106 in response to DDL that instructs the DDL processor 106 to create a new partitioned table 110, or DDL that instruct the DDL processor 106 to re-partition an existing table 110. It will be appreciated that the map 400 shown in FIG. 4 is illustrative and the particular approach for implementing such a partitioning map 400 in a database will depend, at least, on the particular database and/or table architecture, such as the number of partitions and the number of dimensions over which a given table is being partitioned.

In this example, the map 400 is based on the possible combinations of modulo values corresponding with table partitioning for two dimensions across four partitions. Since there are four partitions, a modulo 4 operation would be performed on respective hashed dimension values for the two partitioning dimensions to obtain respective index values for use with the map 400. Therefore, each dimension value (d1 and d2 in FIG. 4) has four possible values 0, 1, 2 and 3. Accordingly, there are 16 possible combinations of modulo values in this example, which are indicated with indices "a" through "p" in FIG. 4.

A mapping can be applied for each dimension value to produce the "Partition" mapping illustrated in FIG. 4. For example, the mapping for d1 dimension values in the map 400 is indicated as [0,1], which indicates each d1 dimension modulo value should be mapped to two values, the modulo value and the modulo value plus an offset of +1. Likewise, the mapping for d2 dimension values in the map 400 is indicated as [0,2], which indicates each d2 dimension modulo value should be mapped to two values, the modulo value and the modulo value plus an offset of +2.

In the map 400, the mapping of modulo values for d1 dimension hash values is illustrated using "A" for the determined modulo value and "B" for the offset modulo value. Similarly, the mapping of modulo values for d2 dimension hash values is illustrated using "C" for the determined modulo value and "D" for the offset modulo value. As shown in FIG. 4, the offset modulo values can be mapped by "rolling over" the offset value. For example, for a d2 dimension modulo value of 2, the offset value (+2) can be mapped as 0 (e.g., corresponding with partition 120*a* of the database 300).

Accordingly, modulo values that are determined from hashed dimension values (e.g., ProductDim values and/or SalesDocumentDim values) can then be used to index the map 400 to determine, for an insert operation, a partition into which to insert a given record, and, for a join operation, a set of candidate partitions in which a record with a given dimension value could be stored. Such techniques are discussed in further detail below.

Briefly, in this example, the map 400 has, for each possible combination of modulo values for d1 and d2 hashed dimension values, a single common partition in its partition mapping section. For example, the index "h" in the map 400 corresponds with, for the d1 dimension, a modulo value of 1 and offset value of 2 (e.g., corresponding with partitions 120*b* and 120*c* of the database 300), and, for the d2 dimension, a modulo value of 3 and a rolled-over offset value of 1 (e.g., corresponding with, respectively, partitions 120*d* and 120*b* of the database 300). Therefore, a common partition (e.g., partition 1, or partition 210*b* in database 300) can be determined from the map 400 when both dimension values are available (e.g., in the case of DML for inserting a record in the fact table 210).

In situations where only a single dimension value is available, such as when the dimension tables 220 and 230 are being joined with the fact table 210, the map 400 (e.g., the respective modulo value mapping) can be used to determine which partitions (e.g., a set of candidate partitions) each of the records of the dimension tables 220 and 230 need to be joined with to ensure an associated query will be accurately processed. For instance, if a SalesDocumentDim value for a row in the dimension table 230 produces a hash(d2) modulo 4 value of 2, based on the mapping of d2 dimension values in the map 400, the corresponding row of the dimension table 230 should be sent to partition 2 (partition 120*c*) and partition 1 (partition 120*a*), which, in accordance with the map 400, are the two partitions of the fact table 210 in which records having that such a d2 dimension value (e.g., that produces a hash(d2) modulo 4 result of 2) are stored.

Figure 5:
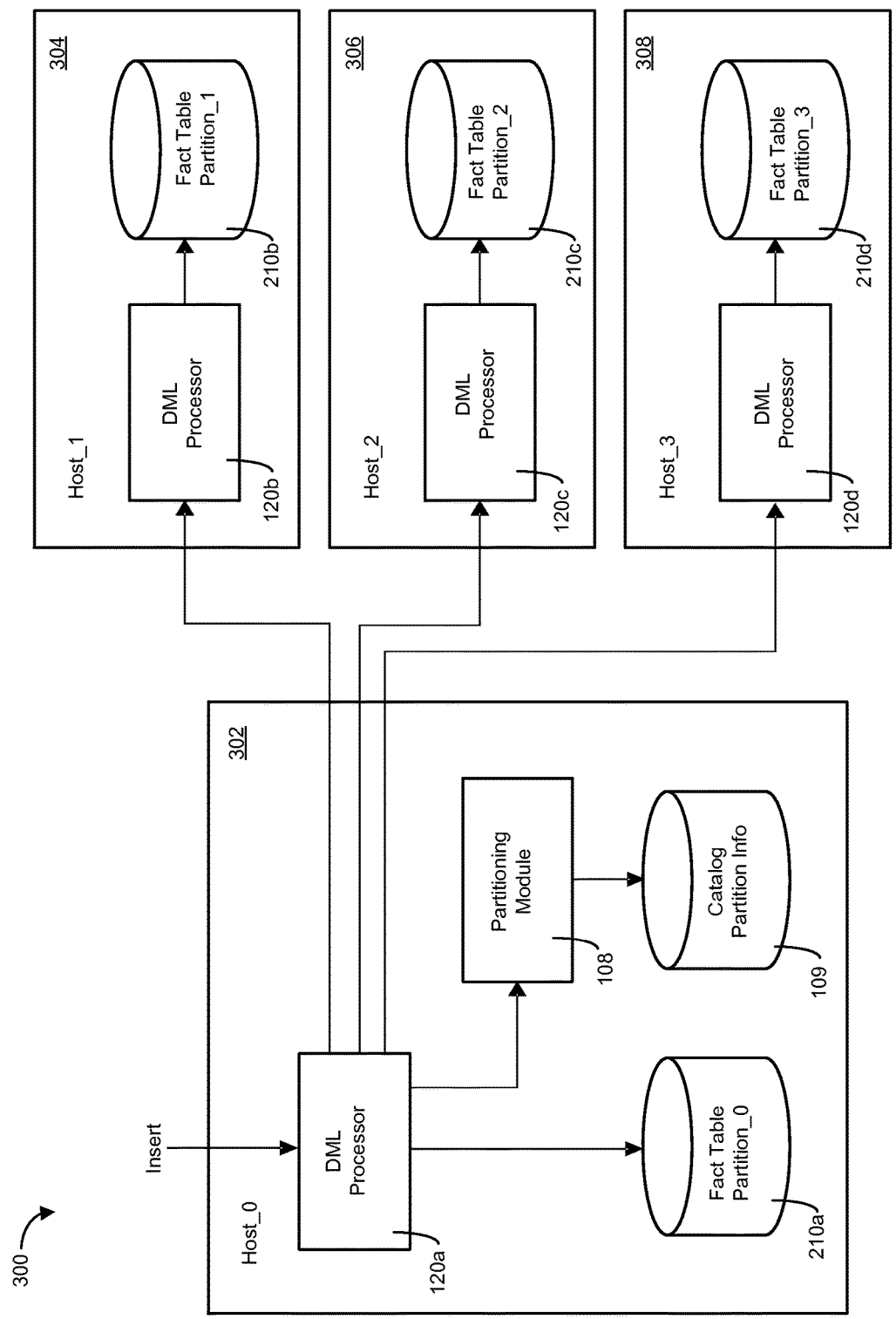
FIG. 5 is a block diagram of a database illustrating insertion of a record (row) in a single-level, multi-dimension, hash-based partitioned database table, according to an implementation.
Figure 7:
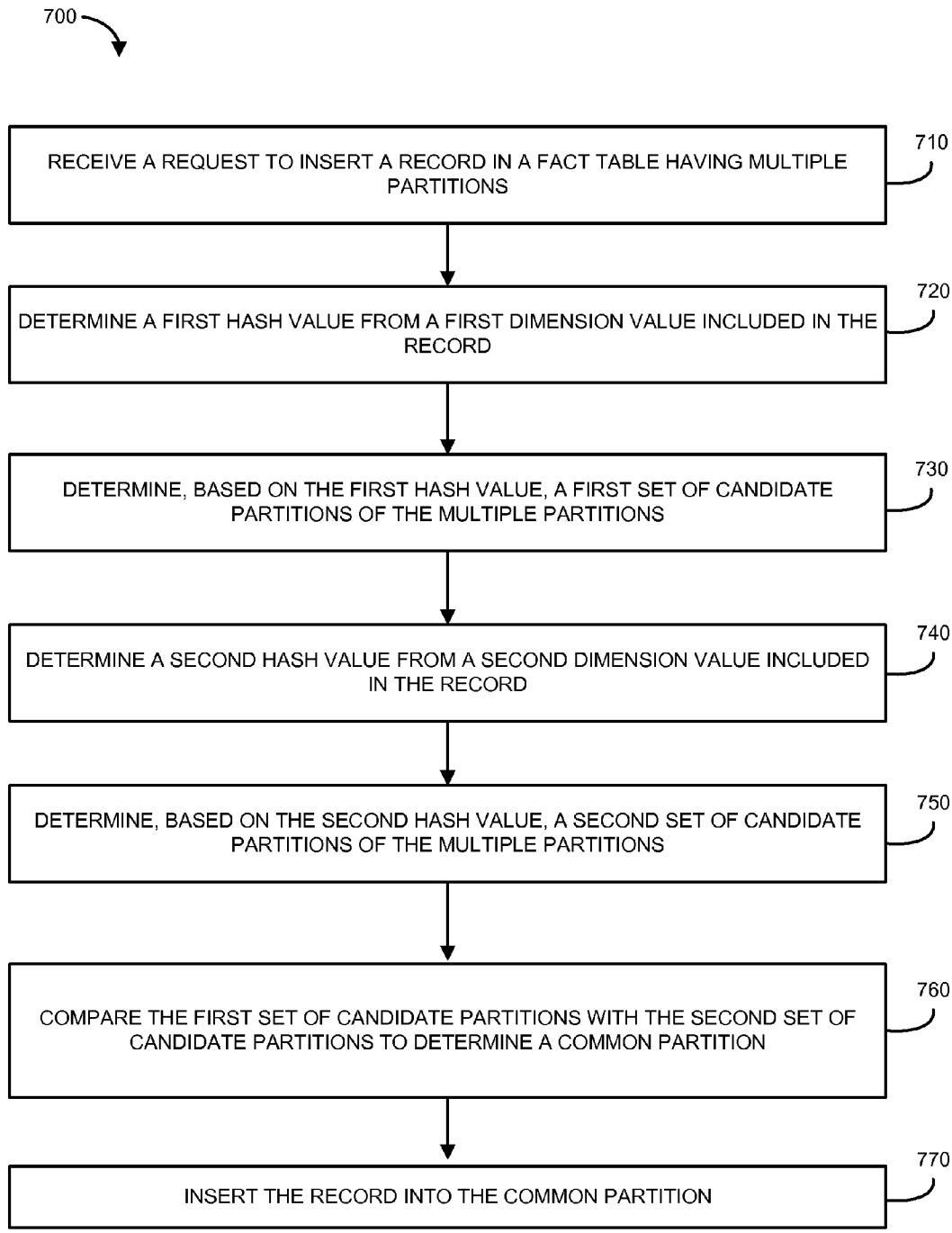
FIG. 7 is flowchart illustrating a method for inserting records (rows) in a database table that is partitioned using single-level, multi-dimension, hash-based table partitioning, according to an implementation.

FIGS. 5, 6 and 7 illustrate a process for inserting (e.g., using DML) the records of the fact table 210 of FIG. 2 into the partitions 210*a*-210*d* in accordance with the map 400 of FIG. 4. Specifically, FIG. 5 is a block diagram of the database 300 including additional elements than those shown in FIG. 3, where the additional elements are used during the insertion of the records (rows) of the fact table 210 (in this example) as a single-level, multi-dimension, hash-based partitioned database table that includes the four partitions 210*a*-210*d*, according to an implementation. FIG. 6 includes tables 610, 620, 630, 640, which illustrate the respective records of the fact table 210 that are inserted in each of the partitions 210*a*-210*d* (partitions 0-3) using single-level, multi-dimension, hash-based table partitioning based on the partitioning map 400 of FIG. 4, according to an implementation. FIG. 7 is a flowchart illustrating a method 700 that can used to insert the records (rows) of the fact table 210 in their respective partitions using single-level, multi-dimension, hash-based table partitioning (e.g., in accordance with the map 400), according to an implementation. An example process of inserting fact table records will be generally described in the context of FIG. 7, with further reference to other FIGs. of the drawings, as appropriate.

Briefly, with reference to FIG. 5, the database 300 is illustrated with an insert request (DML) being received at a DML processor 120*a* of the host 302. In other implementations, insert requests can be received at other hosts of the database 300. Further in FIG. 5, each of the hosts is illustrated as including a DML processor and its respective fact table partition. For instance, host 302 includes a DML processor 120*a* and the fact table partition 210*a*, host 304 includes a DML processor 120*b* and the fact table partition 210*b*, host 306 includes a DML processor 120*c* and the fact table partition 210*c* and host 308 includes a DML processor 120*d* and the fact table partition 210*d*.

Also in FIG. 5, the host 302 is illustrated as including the partitioning module 108 and the catalog 109. While not shown in FIG. 5 for purposes of clarity, the hosts 304, 306 and 308 can also include respective partitioning modules 108 and catalogs 109. In such an approach, one of the hosts 302-308 can act as the "master" for maintaining the catalog 109 (which can include the partitioning map 400) and for updating the catalogs 109 on the other hosts. Accordingly, while the record insertion process for the fact table 210 is illustrated in FIG. 5 with an insert request (DML statement) being received at the host 302, in other instances, the insert request could be received at any of the hosts 302-308.

Referring to FIG. 7, the method 700 includes, at block 710, receiving a request to insert a record in the fact table 210, such as the insert request received at the DML processor 120*a* of the host 302 in FIG. 5. For purposes of illustration, insertion of the first record in the fact table 210 in FIG. 2 will be described. In this example, after receiving the insert request, the DML processor 120*a* may communicate with the partitioning module 108 (and the catalog 109, via the partitioning module 108) to determine that the fact table 210 includes the partitions 210*a*-210*d*, determine where those partitions are stored (e.g., which host each partition is stored on), and determine that the fact table 210 is partitioned based on the map 400.

In the method 700, at block 720, the DML processor 120a can determine a first hash value from a first dimension value included in the record being inserted, such as determining a hash value for a ProductDim (d1) value included in the record. At block 730, the DML processor 120a, in conjunction with the partitioning module 108, can determine, based on a modulo 4 result of the ProductDim hash value, a first set of candidate partitions of the partitions 210a-210d by using the predetermined mapping for d1 (ProductDim) modulo values in the map 400. In this instance, as the first record in the fact table 210 has a ProductDim value of "cell phone", the modulo 4 value of its hash, as shown in dimension table 220 in FIG. 2, is 0. Based on the mapping of [0,1] for d1 modulo values in the map 400, the first set of candidate partitions can be determined as partition 0 (partition 210a) and partition 1 (partition 210b).

At block 740, the DML processor 120a can determine a second hash value from a second dimension value included in the record being inserted, such as determining a hash value for a SalesDocumentDim (d2) value included in the record. At block 750, the DML processor 120a, in conjunction with the partitioning module 108, can determine, based on a modulo 4 result of the SalesDocumentDim hash value, a second set of candidate partitions of the partitions 210a-210d by using the predetermined mapping for d2 modulo values in the map 400. In this instance, as the first record in the fact table 210 has a SalesDocumentDim value of "342335", the modulo 4 value of its hash, as shown in dimension table 230 in FIG. 2, is 2. Based on the mapping of [0,2] for d2 modulo values in the map 400, the second set of candidate partitions can be determined as partition 2 (partition 210c) and partition 0 (partition 210a). In this example, the first and second sets of candidate partitions correspond with the modulo value combination at index "c" in the map 400.

At block 760, the DML processor 120a can compare the first set of candidate partitions with the second set of candidate partitions to determine a common partition between the first set of candidate partitions and the second set of candidate partitions, which in this instance (e.g., for the value combination of index "c" in the map 400) would be partition 0 (partition 210a). As the partition 0 is local to host 302, the DML processor 120a can, at block 770 of the method 700, insert the record into the partition 210a.

As another example, insertion (in accordance with the method 700) of the last record in the fact table 210 in FIG. 2 will be described. In this example, as with the example for the first record of the fact table 210 discussed above, after receiving the insert request for the last record of the fact table 210, the DML processor 120a may communicate with the partitioning module 108 (and the catalog 109, via the partitioning module 108) to determine that the fact table 210 includes the partitions 210a-210d, determine where those partitions are stored (e.g., which host each partition is stored on), and determine that the fact table 210 is partitioned based on the map 400.

At block 720 in this example, the DML processor 120a can determine a first hash value from the ProductDim (d1) value "Laptop" included in the record. At block 730, the DML processor 120a, in conjunction with the partitioning module 108, can determine, based on a modulo 4 result of the ProductDim hash value for "Blender", a first set of candidate partitions of the partitions 210a-210d by using the predetermined mapping for d1 modulo values in the map 400. In this instance, the modulo 4 value for "Blender", as shown in dimension table 220 in FIG. 2, is 1. Based on the mapping of [0,1] for d1 values in the map 400, the first set of candidate partitions can be determined as partition 1 (partition 210b) and partition 2 (partition 210c).

At block 740 in this example, the DML processor 120a can determine a second hash value from the SalesDocumentDim (d2) value "342336" included in the record. At block 750, the DML processor 120a, in conjunction with the partitioning module 108, can determine, based on a modulo 4 result of the SalesDocumentDim hash value, a second set of candidate partitions of the partitions 210a-210d by using the predetermined mapping for d2 modulo values in the map 400. In this instance, the modulo 4 value for the hash of "342336", as shown in dimension table 230 in FIG. 2, is 3. Based on the mapping of [0,2] for d2 values in the map 400, the second set of candidate partitions can be determined as partition 3 (partition 210d) and partition 1 (partition 210b). In this example, the first and second sets of candidate partitions correspond with the value combination at index "h" in the map 400.

At block 760 in this example, the DML processor 120a can compare the first set of candidate partitions with the second set of candidate partitions to determine a common partition between the first set of candidate partitions and the second set of candidate partitions, which in this instance (e.g., for the value combination of index "h" in the map 400) would be partition 1 (partition 210b). As the partition 210b is remote to the host 302 and is stored on the host 304, the DML processor 120a can, at block 770 of the method 700, send the record to the DML processor 120b of the host 304 and the DML processor 120b can insert the record into the partition 210b. The other records of the fact table 210 of FIG. 2 can be inserted in the partitions 210a-210b in similar fashion as in the foregoing examples. The tables 610-640 indicate the records, for the fact table 210, that would be inserted into each of the partitions 210a-210d of the fact table 210. Other records can also be inserted using the method 700 and for approaches described herein.

In some implementations, the partitioning of the fact table 210 can be based on more than two dimensions, such as three dimensions, four dimensions, etc. In an example, in addition to or in place of the operations of the method 700, such an approach could include determining a third hash value from a third dimension value that is included in a record being inserted. A third set of candidate partitions of the multiple partitions can be determined based on a modulo result of the third hash value. The first set of candidate partitions, the second set of candidate partitions and the third set of candidate partitions can be compared to determine the common partition. The record being inserted can then be inserted in the determined common partition.

Figure 8:
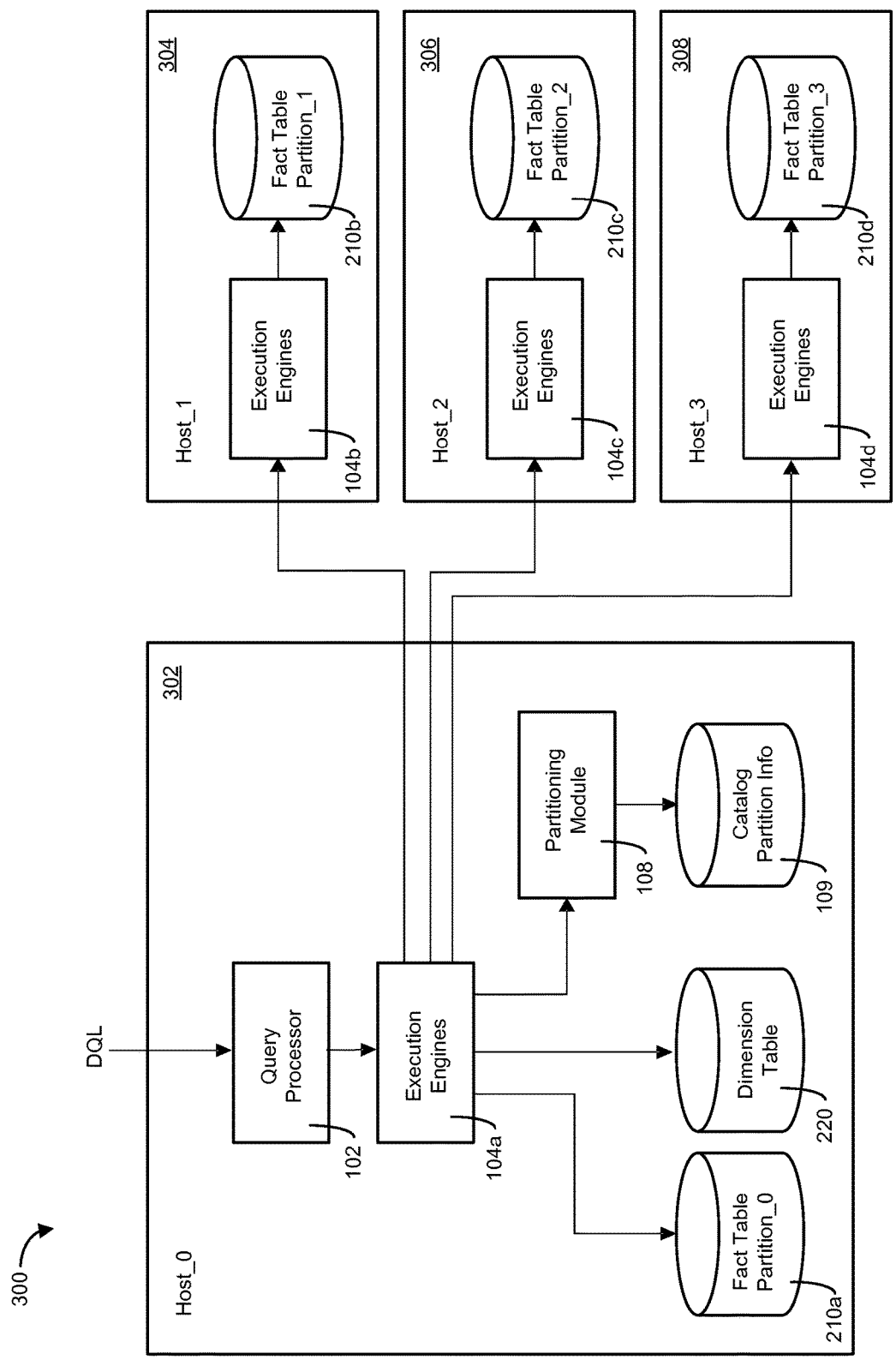
FIG. 8 is block diagram of a database illustrating execution of a query on a single-level, multi-dimension, hash-based partitioned database table, according to an implementation.
Figure 9:
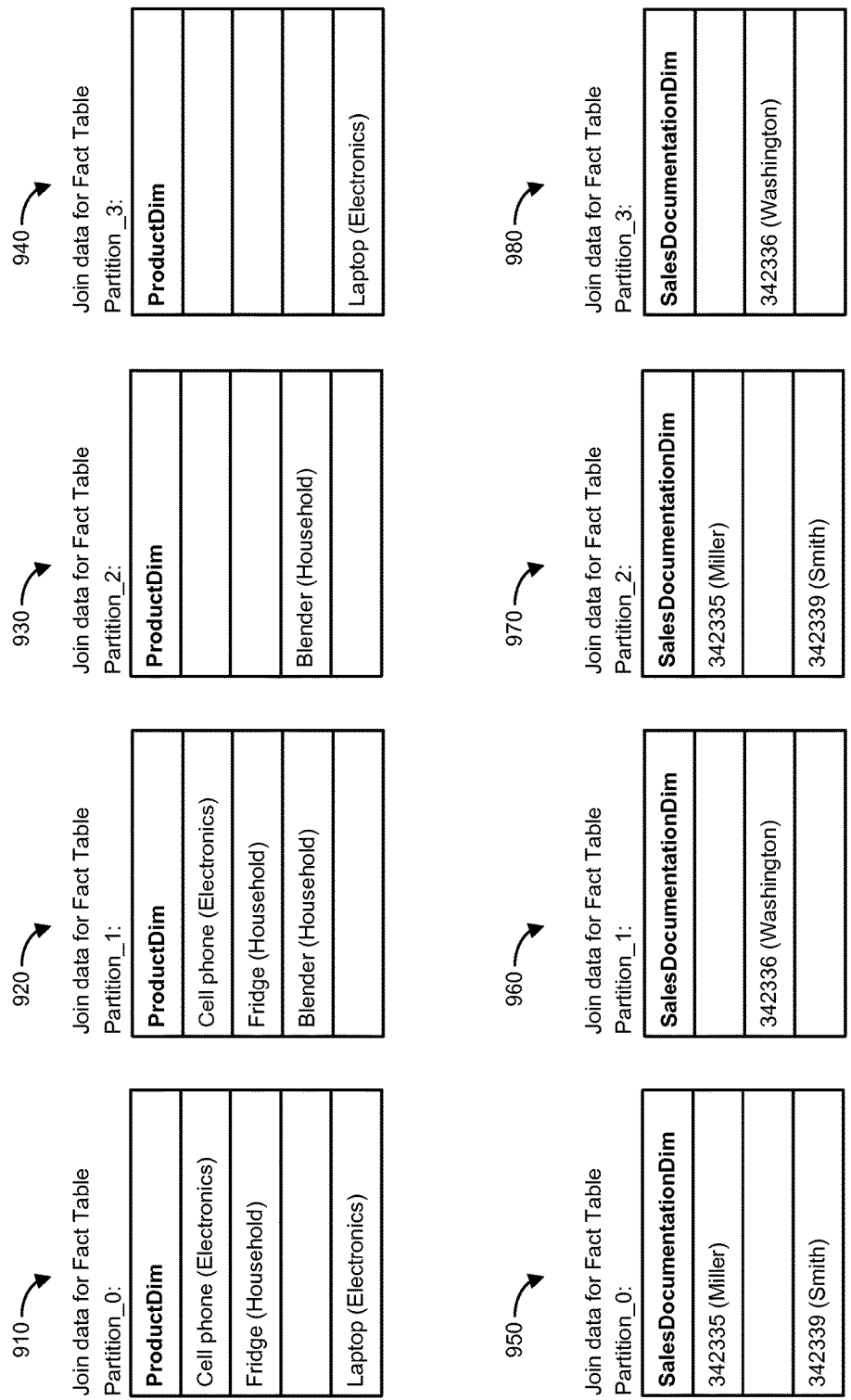
FIG. 9 are tables illustrating join data, based on the partitioning map of FIG. 4, when executing a query over one dimension of the single-level, multi-dimension, hash-based partitioned database table of FIG. 6, according to an implementation.
Figure 10:
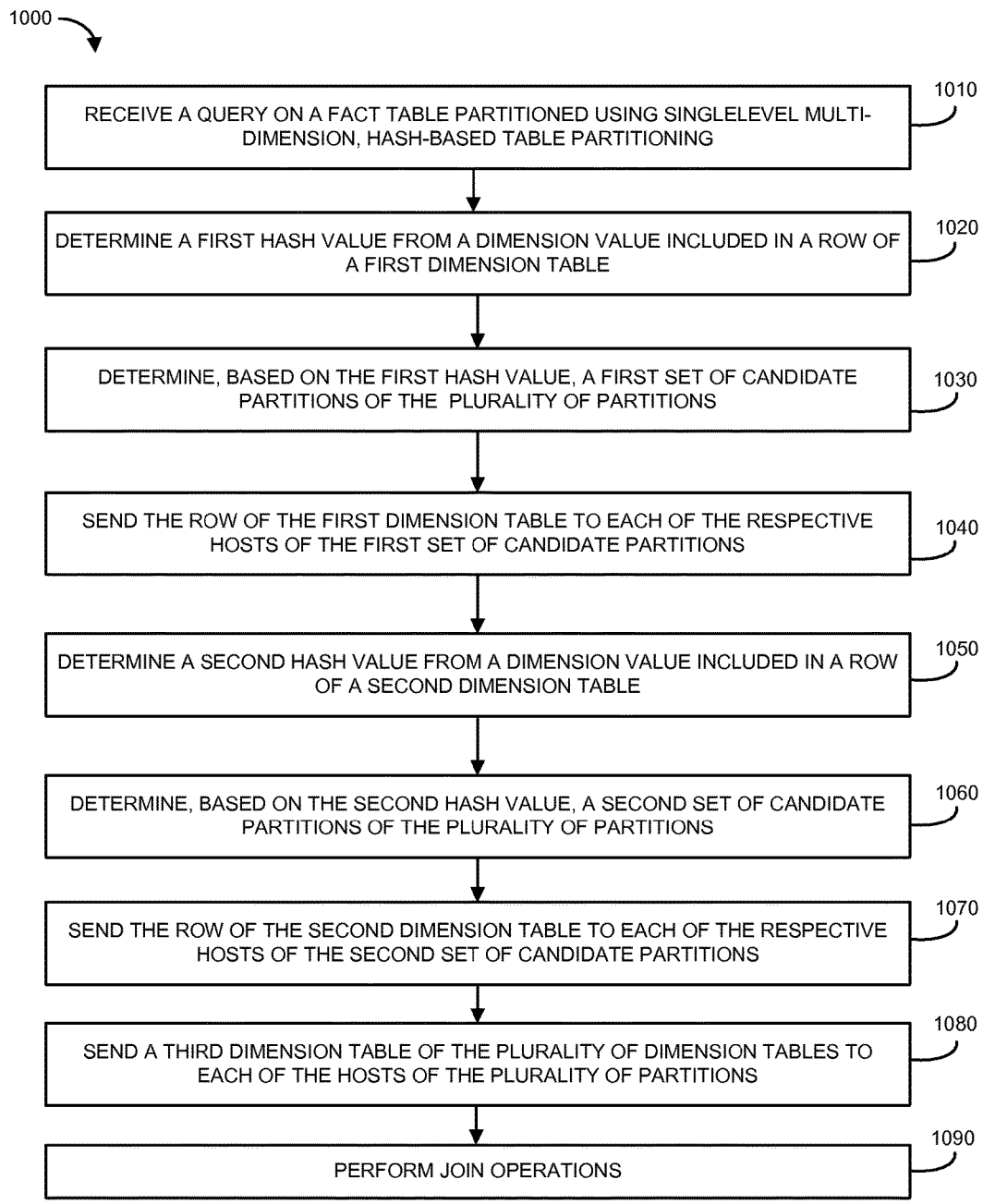
FIG. 10 is flowchart illustrating a method for inserting records (rows) in a database table that is partitioned using single-level multi-dimension, hash-based table partitioning, according to an implementation.

FIGS. 8, 9 and 10 illustrate a process for joining (e.g., in response to a query) the dimension tables 220 and 230 with the partitions 210a-210d of the fact table 210 in accordance with the map 400 of FIG. 4. The approaches described with respect to FIG. 8-10 presume that the records of the fact table 210 were inserted in the partitions 210a-210d in accordance with the map 400.

FIG. 8 is a block diagram of the database 300 including additional elements than those shown in FIG. 3, where the additional elements are used during joins of the dimension tables 220 and 230 with the partitions 210a-210d of the fact table 210, according to an implementation. FIG. 9 includes tables 910, 920, 930, 940, which illustrate the respective records (e.g., ProductDim with associated Group in parentheses) of the dimension table 220 that are joined with each of the partitions 210a-210d (partitions 0-3), according to an implementation. FIG. 9 also includes tables 950, 960, 970, 980, which illustrate the respective records (e.g., SalesDocumentDim with associated SalesAgent in parentheses) of the dimension table 230 that are joined with each of the partitions 210a-210d (partitions 0-3), according to an implementation. FIG. 10 is a flowchart illustrating a method 1000 that can be used for joining the records (rows) of the dimension tables 220 and 230 with the partitions 210a-210d of the fact table 210 in accordance with the map 400, according to an implementation. An example process of joining dimension table records with fact table partitions will be generally described in the context of FIG. 10, with further reference to other FIGs. of the drawings, as appropriate.

Briefly, with reference to FIG. 8, the database 300 is illustrated with a query (DQL) being received at the query processor 102 of the host 302. In other implementations, queries can be received at query processors included in other hosts of the database 300. Further in FIG. 8, each of the hosts 302-308 is illustrated as including execution engines and its respective fact table partition. For instance, host 302 includes execution engines 104a and the fact table partition 210a, host 304 includes execution engines 104b and the fact table partition 210b, host 306 includes execution engines 104c and the fact table partition 210c, and host 308 includes execution engines 104d and the fact table partition 210d.

Also in FIG. 8, the host 302 is illustrated as including the partitioning module 108 and the catalog 109. As with FIG. 5, while not shown in FIG. 8 for purposes of clarity, the hosts 304, 306 and 308 can also include respective partitioning modules 108 and catalogs 109 that can be used when processing queries (or inserting records) in accordance with the techniques described herein. In such an approach, one of the hosts 302-308 can act as the "master" for maintaining the catalog 109 (which can include the partitioning map 400 in this example) and for updating the catalogs 109 on the other hosts. Accordingly, while the join process is illustrated in FIG. 8 with a query (DQL statement) being received at the host 302, in other instances, the query could be received at any of the hosts 302-308. Further in FIG. 8, the dimension table 220 of the host 302 is illustrated, while the dimension table 230 of the host 204 is not shown. It will be appreciated, however, that joins of the dimension table 230 with the partitions 210a-210d can be accomplished in similar fashion as described below for joins of the dimension table 220 with the partitions 210a-210d.

For purposes of illustration, joining of the first record in the dimension table 220 (in accordance with the method 1000) with the appropriate partitions 210a-210d of the fact table 210 in FIG. 2 will be described. It will be appreciated that join operations for the other records of the dimension table 220 and join operations for the records of the dimension table 230 of the host 304 can be accomplished in like manner.

Referring to FIG. 10, the method 1000 includes, at block 1010, receiving a query (DQL) on the fact table 210 at the query processor 102 of the host 302 in FIG. 8. In this example, after receiving the query, the query processor 102 may communicate with the execution engines 104a of the host 302 to coordinate processing of the query. In processing the query, the query processor 102 and/or the execution engines 104a (in conjunction with the partitioning module 108 and the catalog 109) can determine that the query is on the fact table 210, determine that the fact table 210 includes the partitions 210a-210d, determine where those partitions are stored (e.g., which host each partition is stored on), and determine that the fact table 210 is partitioned in accordance with the map 400.

At block 1020, in this example, the method 1000 includes the execution engines 104a obtaining the first record from the dimension table 220 and determining a first hash value from the ProductDim value "cell phone" in that record. At block 1030, the execution engines 104a (in conjunction with the partitioning module 108) can determine, from a modulo 4 value of the ProductDim hash value, a set of candidate partitions of the plurality of partitions. The set of candidate partitions can be a subset of the plurality of partitions that are determined using the predetermined mapping for d1 modulo values in the map 400. For instance, for the ProductDim value "cell phone", as is shown in dimension table 220, the modulo value of its hash is 0. Using the mapping of [0,1] for d1 values in the map 400, the set of candidate partitions for the ProductDim value "cell phone" can be determined as partition 210a (partition 0) and partition 210b (partition 1).

At block 1040, the method 1000 can include the execution engines 104a of the host 302 sending the first row of the dimension table 220 to the host 204, which includes the candidate partition 210b. The host 302 can also retain a copy of the row for use in a join, as the host 302 includes the candidate partition 210a. Similar determinations can be made for each of the other rows in the dimension table 220 and those rows can be provided to the hosts that include their associated candidate partitions.

In the method 1000, the execution engines 104a of the host 302 can determine that the dimension table 230 also needs to be joined, in accordance with the map 400, with the partitions 210a-210d. The execution engines 104a can then send appropriate information regarding the query received at block 1010 to the execution engines 104b of the host 304 so that the execution engines 104b can process the dimension table 230 (at blocks 1050, 1060 and 1070) for joins with the partitions 210a-210d of the fact table 210 in similar manner as discussed above with respect to the processing of the dimension table 220 by the execution engines 104a. The processing of the dimension table 230 by the execution engines 104b of the host 304 can be performed in parallel with the processing of the dimension table 220 by the execution engines 104a of the host 302.

As shown in FIG. 10, the method 1000 can also include sending a third dimension (e.g., in its entirety) to each of the hosts (or using a local copy) for use in join operations with the fact table 210. At block 1090, the method 1000 includes each of the hosts 302-308 performing intermediate join operations of the dimension table records provided at blocks 1040, 1070 and 1090 with their respective their fact table partitions. Intermediate join results can be sent to from the hosts 304, 306, 308 to the host 302 and the execution engines 104a of the host 302 can compile (merge, aggregate, etc.) the received results with its local intermediate join results and provide final join results to the query processor 102 for use in responding to the query of block 1010. Tables 910-940 in FIG. 9 illustrate the data from the dimension table 220 (from the host 302) that would be respectively joined (by the method 1000) with each of the fact table partitions 210a-210d in the database 300. Likewise, tables 950-980 in FIG. 9 illustrate the data from the dimension table 230 (from the host 304) that would be respectively joined (by the method 1000) with each of the fact table partitions 210a-210d in the database 300.

FIG. 11 is a table illustrating another example single-level multi-dimension, hash-based table partitioning map (map) 1100, according to an implementation. The map 1100 can be used to implement single-level, multi-dimension, hash-based partitioning for two dimensions (e.g., d1 and d2) across three fact table partitions with two target (possible) partitions of the three partitions per dimension value. In this example, the predetermined mapping for modulo results for dimension hash values can be the same for both d1 and d2 modulo results, i.e., [0,1]. In this example, there are some modulo values combinations that have two common partitions in the partition mapping section of the map 1100. For instance, the value combinations at indices a, e and i of the map 1100 have two common partitions.

In such an implementation (in the context of the database 300), the DML processors 120*a*-120*d*, the partitioning module 108 and/or the execution engines 104*a*-104*d* can apply a secondary rule to select a target partition in those instances where the map 1100 indicates two common partitions for a given modulo value combination. A number of different secondary rules are possible. For instance, a secondary rule may be applied where the lowest numbered fact table partition of multiple common partitions is selected. In other approaches, the selected partition may be determined based on whether the dimension value hash results are odd or even (e.g., an individual hash result for the d1 or d2 value, a sum of the hash results for the d1 and d2 hash values, and so forth). In the case of an odd result, the lowest numbered common partition could be selected, while in the case of an even result, the highest numbered common partition could be selected. In other implementations, other secondary rules may be applied.

The partitioning map that is used to partition a fact table (or other table) will depend on the particular implementation, e.g., the number of dimensions being partitioned over, the number of partitions included in a given fact table and/or a number of target (possible) partitions for storing records including a given dimension value. As an additional example, in a fact table with 8 partitions that is partitioned over 3 dimensions (d1, d2, d3), using single-level, multi-dimension, hash-based table partitioning (with 4 target partitions per dimension), the following modulo value patterns can be used for partition mapping; for d1: [0, 1, 2, 3], for d2: [0, 1, 4, 5], and for d3: [0,2, 4, 6], which results in a single common partition for each modulo value combination in an associated partitioning map. Of course other mapping patterns allowing for a single common partition per modulo value combinations and other mapping patterns allowing for one or two common partitions per modulo value combination are possible.

In an example implementation, a computer-implemented method for inserting a record in a fact table of a database, where the fact table has multiple partitions, and the database has multiple dimension tables corresponding with the fact table, can include receiving a request to insert the record in the fact table. The method can also include determining a first hash value from a first value included in the record, the first value corresponding with a first dimension table of the multiple dimension tables, and determining, based on the first hash value, a first set of candidate partitions of the multiple partitions. The method can further include determining a second hash value from a second value included in the record, the second value corresponding with a second dimension table of the multiple dimension tables and determining, based on the second hash value, a second set of candidate partitions of the multiple partitions. The method can also further include comparing the first set of candidate partitions with the second set of candidate partitions to determine a common partition between the first set of candidate partitions and the second set of candidate partitions, and inserting the record into the common partition.

Implementations can include one or more of the following features. For example, the request can be received at a first host of the database, where the common partition can be stored in a second host of the database. The method can include, prior to inserting the record into the common partition, sending the record from a data manipulation language (DML) processor of the first host to a DML processor of the second host.

The first hash value and the second hash value can be determined using a same hash function. The first set of candidate partitions and the second set of candidate partitions can have a single common partition. The first set of candidate partitions and the second set of candidate partitions can have multiple common partitions, and selecting the common partition for storing the record can include selecting the common partition for storing the record from the multiple common partitions using a predetermined selection rule.

The first set of candidate partitions can be determined using a first predetermined pattern and the second set of candidate partitions can be determined using a second predetermined pattern. Prior to the comparing the first set of candidate partitions with the second set of candidate partitions to determine a common partition, the method can include determining a third hash value from a third value included in the record, the third value corresponding with a third dimension table of the multiple dimension tables, and determining, based on the third hash value, a third set of candidate partitions of the multiple partitions. The comparing the first set of candidate partitions with the second set of candidate partitions to determine the common partition can include comparing the first set of candidate partitions, the second set of candidate partitions and the third set of candidate partitions to determine the common partition.

In another example implementation, a computer-implemented method for joining a plurality of dimension tables of a database with a fact table of a database, where the plurality of dimension tables corresponds with the fact table, and the fact table has a plurality of partitions, each partition of the plurality of partitions being stored on a respective host of the database, can include determining a first hash value from a dimension value included in a row of a first dimension table of the plurality of dimension tables. The method can also include determining, based on the first hash value, a first set of candidate partitions of the plurality of partitions. The first set of candidate partitions can be a first subset of the plurality of partitions. The method can further include sending the row of the first dimension table to each of the respective hosts of the first set of candidate partitions. The method can also further include determining a second hash value from a dimension value included in a row of a second dimension table and determining, based on the second hash value, a second set of candidate partitions of the plurality of partitions, the second set of candidate partitions being a second subset of the plurality of partitions, the first set of candidate partitions and the second set of candidate partitions having at least one common partition. The method can still further include sending the row of the second dimension table to each of the respective hosts of the second set of candidate partitions and performing intermediate join operations. The intermediate join operations can include joining the row of the first dimension table with each partition of the first set of candidate partitions and joining the row of the second dimension table with each partition of the second set of candidate partitions.

Implementations can include one or more of the following features. For example, the first set of candidate partitions and the second set of candidate partitions can be determined using a predetermined pattern corresponding with a single-level, multi-dimension partitioning map. Partitioning of the fact table can be based on values in records of the fact table corresponding with the first dimension table and values in the records of the fact table corresponding with the second dimension table.

Prior to the performing the respective join operations, the method can include sending a third dimension table of the plurality of dimension tables to each of the respective hosts of the plurality of partitions. The performing the respective join operations can include joining the third dimension with each partition of the plurality of partitions. Partitioning of the fact table can be based on values in records of the fact table corresponding with the first dimension table and values in the records of the fact table corresponding with the second dimension table.

In yet another example implementation, a computer-implemented method can include receiving a request to insert a record in a fact table included in a database, where the fact table has multiple partitions, each of the multiple partitions being included in a respective host. The method can also include determining a first hash value from a first value included in the record, where the first value corresponds with a first dimension table corresponding with the fact table, and determining, based on the first hash value, a first set of candidate partitions of the multiple partitions. The method can further include determining a second hash value from a second value included in the record, where the second value corresponds with a second dimension table corresponding with the fact table, and determining, based on the second hash value, a second set of candidate partitions of the multiple partitions. The method can also further include comparing the first set of candidate partitions with the second set of candidate partitions to determine a common partition between the first set of candidate partitions and the second set of candidate partitions and inserting the record into the common partition.

The method can yet further include receiving a request to join the first dimension table and the second dimension table with the fact table; determining a third hash value from a dimension value included in a row of the first dimension table; determining, based on the third hash value, a third set of candidate partitions of the plurality of partitions the third set of candidate partitions being a first subset of the plurality of partitions; and sending the row of the first dimension table to each of the respective hosts of the third set of candidate partitions. The method can yet also include determining a fourth hash value from a dimension value included in a row of the second dimension table; determining, based on the fourth hash value, a fourth set of candidate partitions of the plurality of partitions, the fourth set of candidate partitions being a second subset of the plurality of partitions, the third set of candidate partitions and the fourth set of candidate partitions having at least one common partition; and sending the row of the second dimension table to each of the respective hosts of the fourth set of candidate partitions. The method can still further include performing intermediate join operations including joining the row of the first dimension table with each partition of the third set of candidate partitions and joining the row of the second dimension table with each partition of the fourth set of candidate partitions.

Implementations can include one or more of the following features. For example, the first set of candidate partitions and the second set of candidate partitions can have multiple common partitions. Selecting the common partition for storing the record can include selecting the common partition for storing the record from the multiple common partitions using a predetermined selection rule.

The first set of candidate partitions and the third set of candidate partitions can be determined using a first predetermined pattern. The second set of candidate partitions and the fourth set of candidate partitions can be determined using a second predetermined pattern.

Prior to the performing the intermediate join operations, the method can include sending a third dimension table of the plurality of dimension tables to each of the respective hosts of the plurality of partitions. The performing the intermediate join operations can include joining the third dimension with each partition of the plurality of partitions.

The first hash value, the second hash value, the third hash value and the fourth hash value can be determined using a same hash function. The first set of candidate partitions and the second set of candidate partitions can have a single common partition.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of example implementations have been illustrated and described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for joining a plurality of dimension tables of a database with a fact table of a database, the plurality of dimension tables corresponding with the fact table, the fact table having a plurality of partitions, each partition of the plurality of partitions being stored on a respective host of the database, the method comprising:
    determining a first hash value from a dimension value included in a row of a first dimension table of the plurality of dimension tables;
    determining, based on the first hash value, a first set of candidate partitions of the plurality of partitions, the first set of candidate partitions being a first subset of the plurality of partitions;
    sending the row of the first dimension table to each of the respective hosts of the first set of candidate partitions;
    determining a second hash value from a dimension value included in a row of a second dimension table;
    determining, based on the second hash value, a second set of candidate partitions of the plurality of partitions, the second set of candidate partitions being a second subset of the plurality of partitions, the first set of candidate partitions and the second set of candidate partitions having at least one common partition; and
    sending the row of the second dimension table to each of the respective hosts of the second set of candidate partitions; and
    performing intermediate join operations including:
        joining the row of the first dimension table with each partition of the first set of candidate partitions; and
        joining the row of the second dimension table with each partition of the second set of candidate partitions.

2. The computer-implemented method of claim 1, wherein the first set of candidate partitions and the second set of candidate partitions are determined using a predetermined pattern corresponding with a single-level, multi-dimension partitioning map.

3. The computer-implemented method of claim 1, wherein partitioning of the fact table is based on values in records of the fact table corresponding with the first dimension table and values in the records of the fact table corresponding with the second dimension table.

4. The computer-implemented method of claim 1, wherein, prior to the performing the respective join operations, the method further comprises:
    sending a third dimension table of the plurality of dimension tables to each of the respective hosts of the plurality of partitions,
    the performing the respective join operations including joining the third dimension with each partition of the plurality of partitions.

5. The computer-implemented method of claim 1, wherein partitioning of the fact table is based on values in records of the fact table corresponding with the first dimension table and values in the records of the fact table corresponding with the second dimension table.

6. A computer-implemented method comprising:
    receiving a request to insert a record in a fact table included in a database, the fact table having multiple partitions, each of the multiple partitions being included in a respective host;
    determining a first hash value from a first value included in the record, the first value corresponding with a first dimension table corresponding with the fact table;
    determining, based on the first hash value, a first set of candidate partitions of the multiple partitions;
    determining a second hash value from a second value included in the record, the second value corresponding with a second dimension table corresponding with the fact table;
    determining, based on the second hash value, a second set of candidate partitions of the multiple partitions;
    comparing the first set of candidate partitions with the second set of candidate partitions to determine a common partition between the first set of candidate partitions and the second set of candidate partitions;
    inserting the record into the common partition;
    receiving a request to join the first dimension table and the second dimension table with the fact table;
    determining a third hash value from a dimension value included in a row of the first dimension table;
    determining, based on the third hash value, a third set of candidate partitions of the plurality of partitions the third set of candidate partitions being a first subset of the plurality of partitions;
    sending the row of the first dimension table to each of the respective hosts of the third set of candidate partitions;
    determining a fourth hash value from a dimension value included in a row of the second dimension table;
    determining, based on the fourth hash value, a fourth set of candidate partitions of the plurality of partitions, the fourth set of candidate partitions being a second subset of the plurality of partitions, the third set of candidate partitions and the fourth set of candidate partitions having at least one common partition; and
    sending the row of the second dimension table to each of the respective hosts of the fourth set of candidate partitions; and
    performing intermediate join operations including:
        joining the row of the first dimension table with each partition of the third set of candidate partitions; and
        joining the row of the second dimension table with each partition of the fourth set of candidate partitions.

7. The computer-implemented method of claim 6, wherein:

the first set of candidate partitions and the second set of candidate partitions have multiple common partitions; and selecting the common partition for storing the record includes selecting the common partition for storing the record from the multiple common partitions using a predetermined selection rule.

8. The computer-implemented method of claim 6, wherein:

the first set of candidate partitions and the third set of candidate partitions are determined using a first predetermined pattern; and the second set of candidate partitions and the fourth set of candidate partitions are determined using a second predetermined pattern.

9. The computer-implemented method of claim 6, wherein, prior to the performing the intermediate join operations, the method further comprises:

sending a third dimension table of the plurality of dimension tables to each of the respective hosts of the plurality of partitions, the performing the intermediate join operations including joining the third dimension with each partition of the plurality of partitions.

10. The computer-implemented method of claim 6, wherein the first hash value, the second hash value, the third hash value and the fourth hash value are determined using a same hash function.

11. The computer-implemented method of claim 6, wherein the first set of candidate partitions and the second set of candidate partitions have a single common partition.

* * * * *